(No Model.)
T. W. PARSHALL.
CLOTH CUTTING MACHINE.
No. 369,466. Patented Sept. 6, 1887.
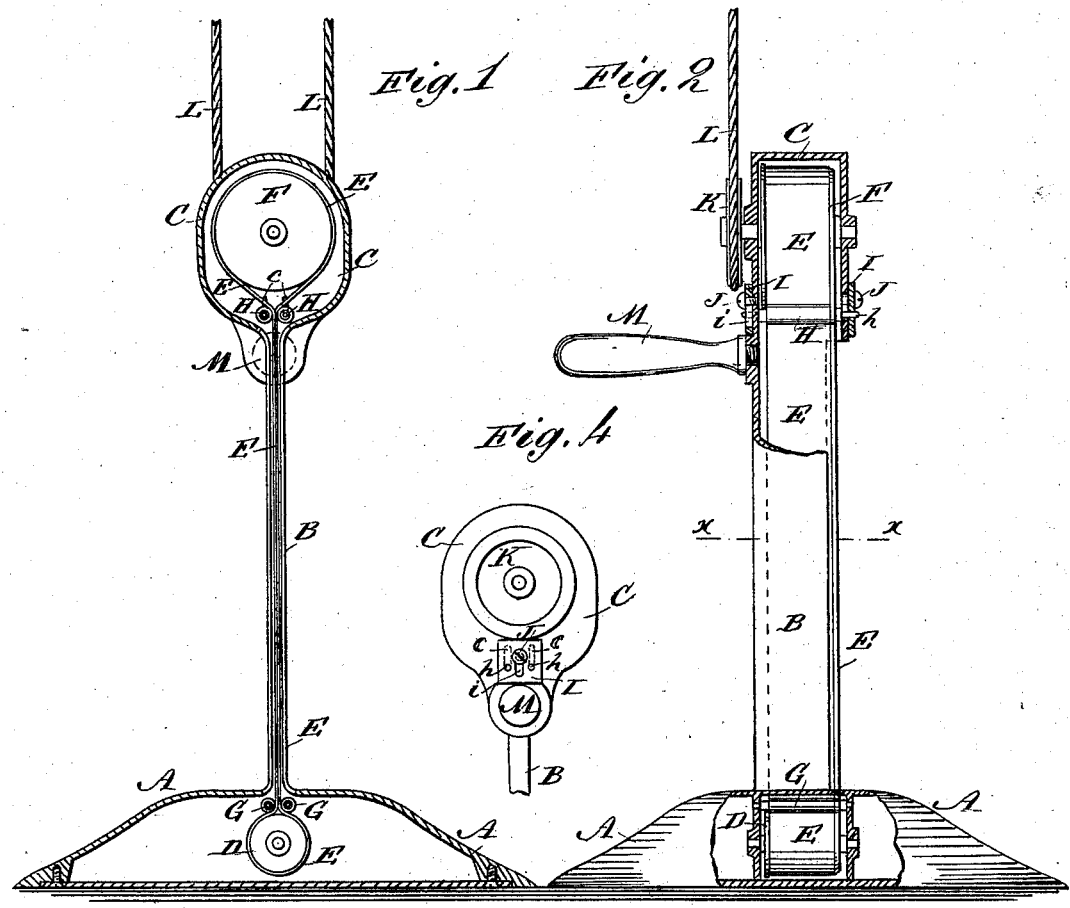
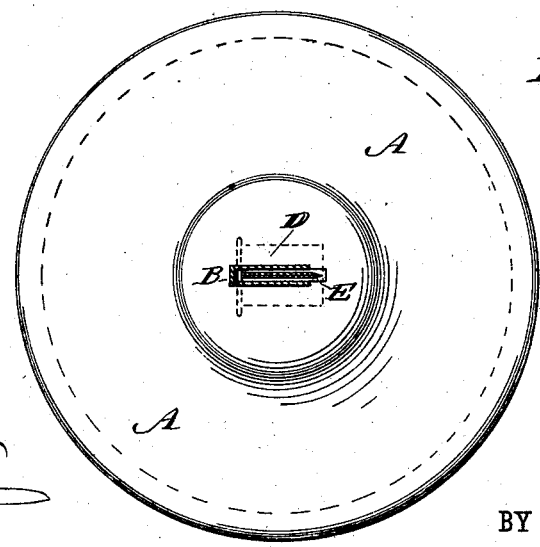
WITNESSES:
C. Neveux
C. Sedgwick
INVENTOR:
T. W. Parshall
BY Munn & Co.
ATTORNEYS.

UNITED STATES PATENT OFFICE.

THOMAS W. PARSHALL, OF BROOKLYN, NEW YORK.

CLOTH-CUTTING MACHINE.

SPECIFICATION forming part of Letters Patent No. 369,466, dated September 6, 1887.

Application filed January 22, 1887. Serial No. 225,099. (No model.)

*To all whom it may concern:*

Be it known that I, THOMAS W. PARSHALL, of Brooklyn, in the county of Kings and State of New York, have invented a new and Improved Cloth-Cutter, of which the following is a full, clear, and exact description.

My invention relates to devices of that class used to cut cloth or textiles while manufacturing clothing or other goods or fabrics; and the invention has for its object to provide a simple, inexpensive, and effective device of this character.

The invention consists in certain novel features of construction and combinations of parts of the cloth-cutter, all as hereinafter fully described and claimed.

Reference is to be had to the accompanying drawings, forming a part of this specification, in which similar letters of reference indicate corresponding parts in all the figures.

Figure 1 is a front sectional elevation of my improved cloth-cutter. Fig. 2 is a side view of the cutter, partly broken away and in section. Fig. 3 is a plan view in horizontal section on the line $x\ x$, Fig. 2; and Fig. 4 is a rear elevation of the top or head portion of the machine.

The cutter is made with a foot-piece or base, A, which is connected rigidly by the grooved or ⊏-shaped knife-guide B, with a head or top piece, C. In the base A there is journaled a roller or pulley, D, around which the endless knife-blade or cutter E is passed, and the knife, after passing upward through the guide B, passes around a pulley, F, journaled in the head-piece C.

A lower pair of anti-friction guide-rollers, G G, are journaled in the base A, directly over the pulley D, in such positions that the knife E passes from the pulley between the rollers, which hold the opposite sides of the endless knife snugly to each other flatwise, and a like pair of anti-friction rollers, H H, arranged in the head-piece C, hold the opposite sides of the knife E closely together. These upper guide-rollers, H H, are journaled in plates I I, which are held by screws J J to the opposite or front and rear faces of the head-piece C, said screws passing through slots $i$, made in the plates I, and the journals $h$ of the rollers H pass through slots $c$, made in the head-piece, thus allowing the plates to be shifted to carry the rollers toward the upper pulley, F, to take up any slackness of the endless knife E when the knife is first adjusted in position, or which may afterward be occasioned by use.

To the journal of the upper pulley, F, there is fixed a pulley, K, to receive a belt, L, running from any convenient prime motor or imparting a continuous rapid revolution to the endless knife around the pulleys D F, and cause those parts of the knife passing through the guide B between the upper and lower rollers, G H, to move in opposite directions. The knife-blade is sharpened wholly from its outer face, as shown in Fig. 3 of the drawings, thereby forming an extremely thin cutting-edge to the knife, which is really formed of two very sharp thin cutting-edges running swiftly in opposite directions.

A handle, M, screwed or otherwise fastened to the head-piece C, is to be grasped by the operator to guide the machine to its work.

The pulleys D F have rear edge flanges to hold the moving knife E on them and take the thrust incident to the back-pressure of the knife when cutting.

The base A is made hollow to secure lightness, and its upper surface slopes off all around toward its margin, which is quite sharp or thin to allow the base to be slipped readily beneath a pile of cloth laid on a table to be cut. The entire machine will be as light as is consistent with necessary strength, to allow it to be easily handled for guiding the endless knife to the outlines or patterns marked out or laid on the cloth to be cut.

In using the machine the handle M will be grasped firmly, and, as the knife E is rapidly moved around the pulleys D F, the base A will be slipped under the cloth, and the edge of the knife will be presented to the marked patterns, and by pressing the blade to the work the knife will sever the cloth easily, as the running of one side of the knife in a direction opposite to that in which its other side is moving causes the knife to act with a shear-cut, which is very effective.

It is obvious that the upper pulley, F, may be operated in any approved way—as, for instance, a flexible driving-shaft may be connected to the pulley, instead of using the pulley and belt K L, hereinbefore described.

Having thus described my invention, what I claim as new, and desire to secure by Letters Patent, is—

1. A cloth-cutter made with an endless knife having a plain or continuous cutting-edge sharpened from the outer face of the blade and running over guides on a suitable support, and with its opposite sides adapted to move closely together face to face in opposite directions where presented to the work, substantially as herein set forth.

2. A cloth-cutter made with an endless knife having a plain or continuous cutting-edge sharpened from the outer face of the blade and running over guides on a suitable support, and with its opposite sides adapted to move closely together face to face in opposite directions where presented to the work, and a handle fitted to the support for guiding the knife to the work, substantially as herein described.

3. A cloth-cutter made with an endless knife having a plain or continuous cutting-edge sharpened from the outer face of the blade and running over pulleys journaled in a suitable support, in combination with guide-rollers holding the opposite sides of the knife closely together face to face where presented to the work, substantially as described, for the purposes set forth.

4. The combination, in a cloth-cutter, of a base, A, head-piece C, and slotted guide B, pulleys D F, journaled in the base and head-piece, and rollers G H, journaled next the pulleys D F, respectively, and holding the opposite sides of the knife closely together face to face, substantially as described, for the purposes set forth.

5. The combination, in a cloth-cutter, of a base, A, and head-piece C, connected by a slotted guide, B, pulleys E F, journaled in the base and head-piece, respectively, an endless knife, E, running over the pulleys and through the guide, rollers G G, journaled in the base and holding the opposite sides of the knife together thereat, and rollers H H, journaled in adjustable plates I I, held to the head-piece and holding the opposite sides of the knife together at the head-piece, substantially as described, for the purposes set forth.

THOMAS W. PARSHALL.

Witnesses:
H. H. SKINNER,
H. B. DALLSMORE.